(12) United States Patent
Tanaka et al.

(10) Patent No.: US 11,976,572 B2
(45) Date of Patent: May 7, 2024

(54) METHOD OF REDUCING TURBINE WHEEL HIGH CYCLE FATIGUE IN SECTOR-DIVIDED DUAL VOLUTE TURBOCHARGERS

(71) Applicant: BorgWarner Inc., Auburn Hills, MI (US)

(72) Inventors: Kai Tanaka, Mills River, NC (US); Tim Weiland, Kirchheimbolanden (DE)

(73) Assignee: BorgWarner Inc., Auburn Hills, MI (US)

( * ) Notice: Subject to any disclaimer, the term of this patent is extended or adjusted under 35 U.S.C. 154(b) by 0 days.

(21) Appl. No.: 17/820,730

(22) Filed: Aug. 18, 2022

(65) Prior Publication Data

US 2023/0068498 A1 Mar. 2, 2023

Related U.S. Application Data

(60) Provisional application No. 63/236,017, filed on Aug. 23, 2021.

(51) Int. Cl.
*F01D 9/02* (2006.01)
*F01D 25/24* (2006.01)

(52) U.S. Cl.
CPC ............ *F01D 9/026* (2013.01); *F01D 25/24* (2013.01); *F05D 2220/40* (2013.01); *F05D 2240/127* (2013.01); *F05D 2250/15* (2013.01); *F05D 2260/941* (2013.01)

(58) Field of Classification Search
CPC ........ F01D 9/026; F01D 25/24; F02B 37/025; F05D 2220/40; F05D 2250/15
See application file for complete search history.

(56) References Cited

U.S. PATENT DOCUMENTS

| | | | |
|---|---|---|---|
| 10,301,952 B2* | 5/2019 | Ausbrooks | ............ F02M 26/06 |
| 10,378,369 B2 | 8/2019 | Yokoyama et al. | |
| 10,487,676 B2 | 11/2019 | Hughes | |
| 10,513,936 B2 | 12/2019 | Mohamed et al. | |
| 10,781,704 B2 | 9/2020 | Yoshida et al. | |
| 2023/0068498 A1* | 3/2023 | Tanaka | .................. F02B 37/025 |

FOREIGN PATENT DOCUMENTS

JP 5870083 B2 2/2016

* cited by examiner

*Primary Examiner* — Christopher R Legendre
(74) *Attorney, Agent, or Firm* — Eric L. Doyle; Stephan A. Pendorf; Patent Central LLC

(57) ABSTRACT

High cycle fatigue (HCF) in a turbine wheel of a sector-divided dual volute turbocharger, particularly a turbocharger where the tongue-to-blade gap is as small as from 1-3% of the wheel diameter, is reduced, by locally increasing the volute cross-sectional area just upstream of the tongues. Thereby, it becomes possible to reduce the force function of the exhaust gas pressure onto the turbine wheel blades. Modifying how the pressure presents itself to the wheel reduces blade excitation and, ultimately, HCF of turbine wheels. In another aspect of the invention, the angle of the tongues are modified to direct the exhaust more directly onto the turbine wheel than conventional tongues. It is surprising that this approach not only accomplishes the desired result, but does this without significant loss of turbine stage efficiency.

3 Claims, 7 Drawing Sheets

Standard Volute 10% A/R

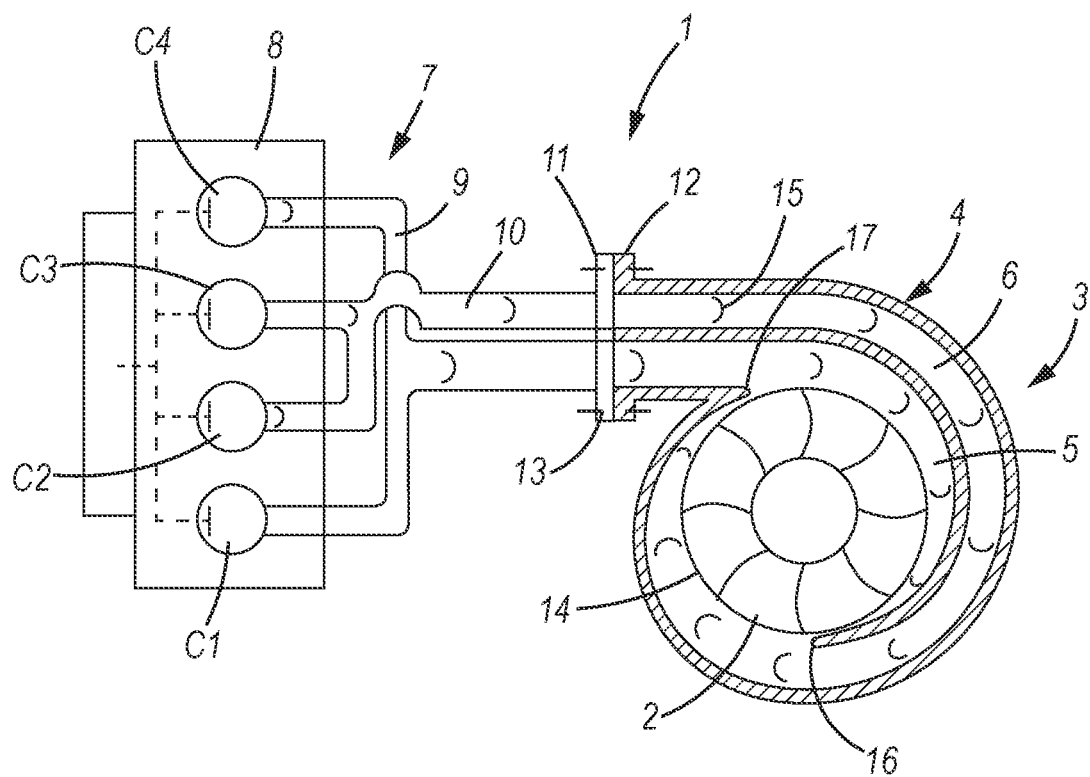
Prior Art
Fig. 1

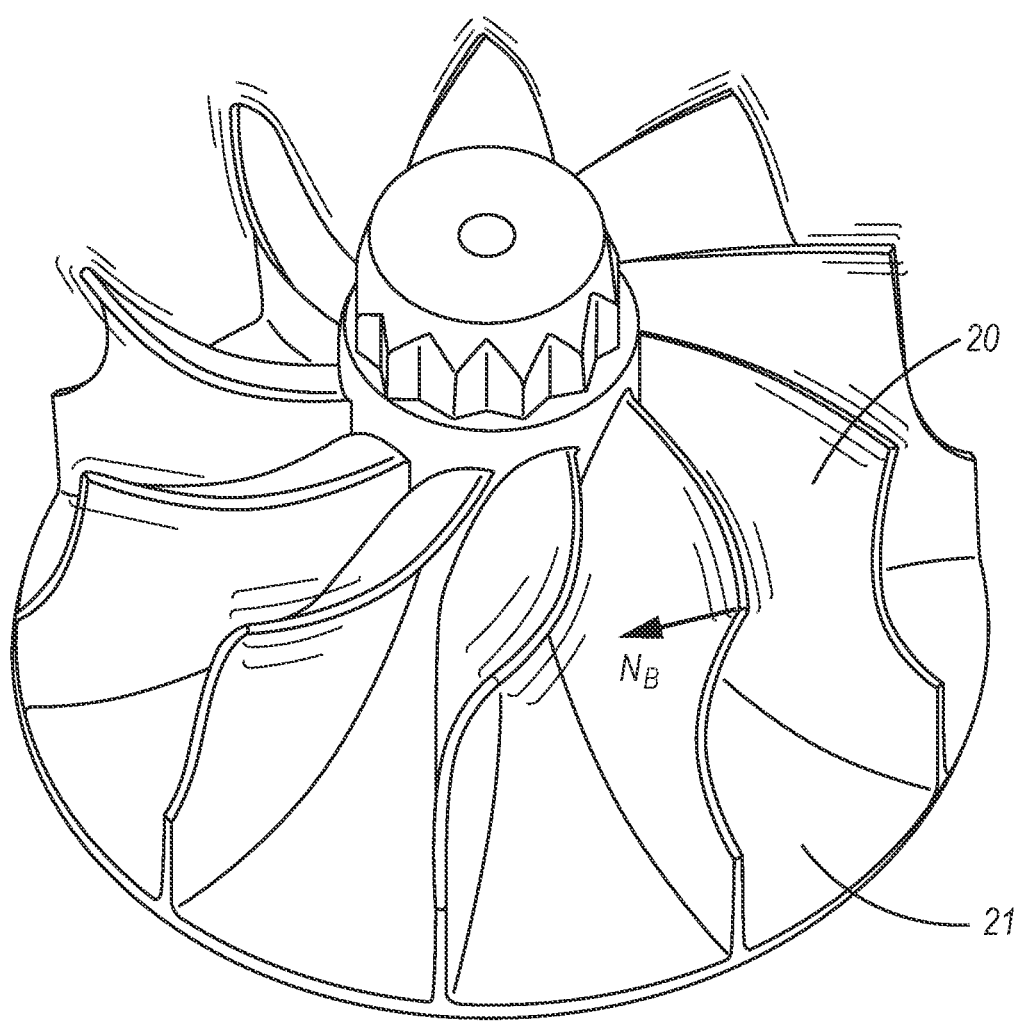
Fig. 2

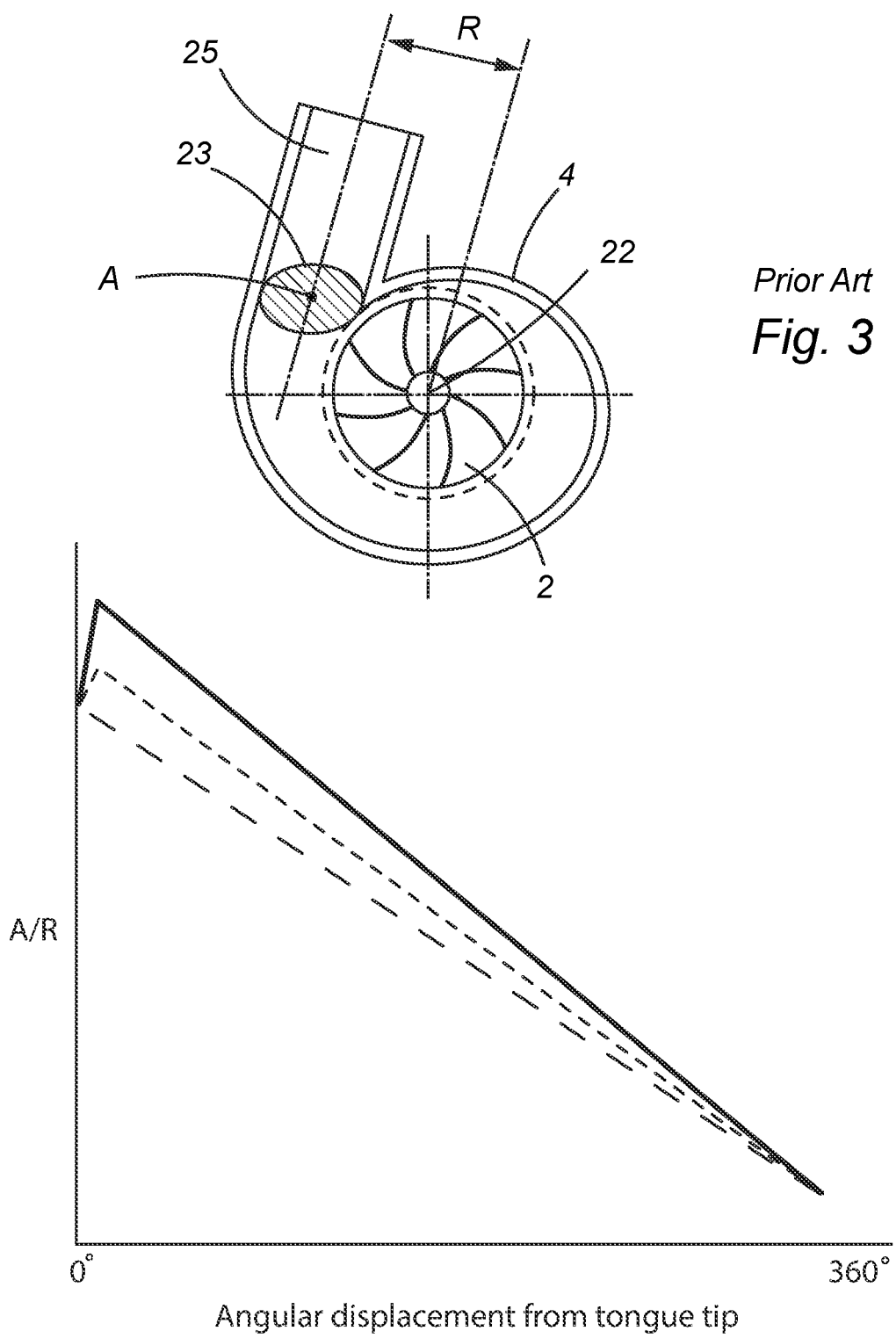
Prior Art
Fig. 3
Prior Art
Fig. 4

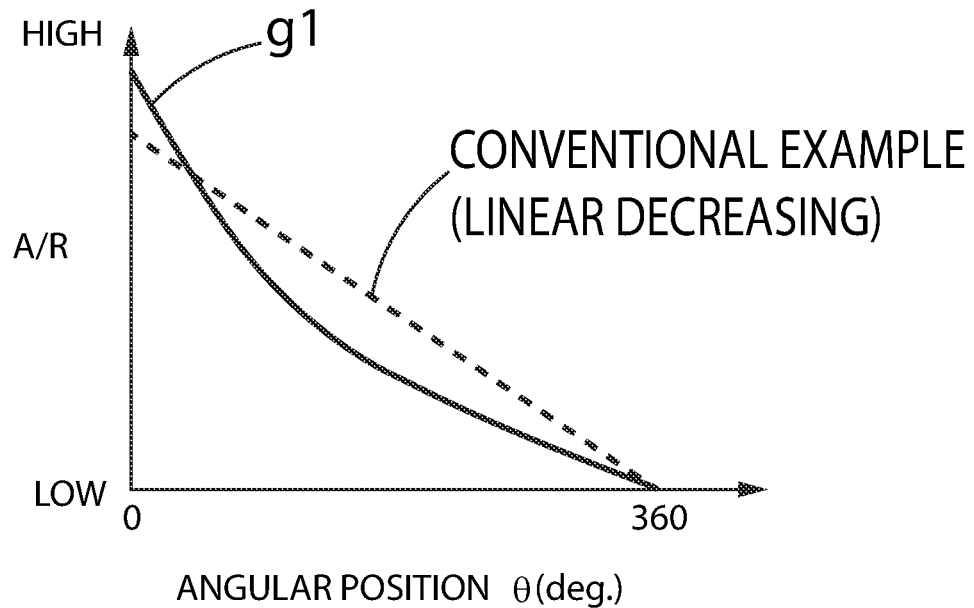
Prior Art
Fig. 5
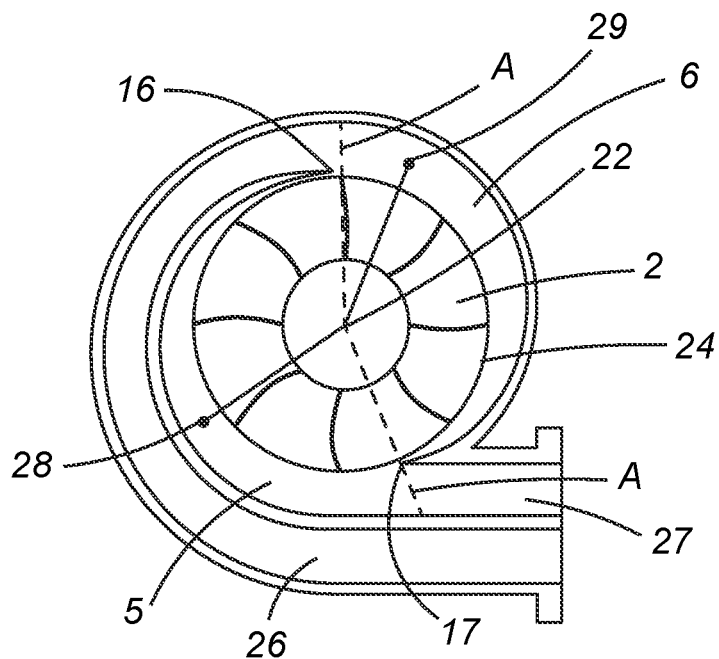
Prior Art
Fig. 6

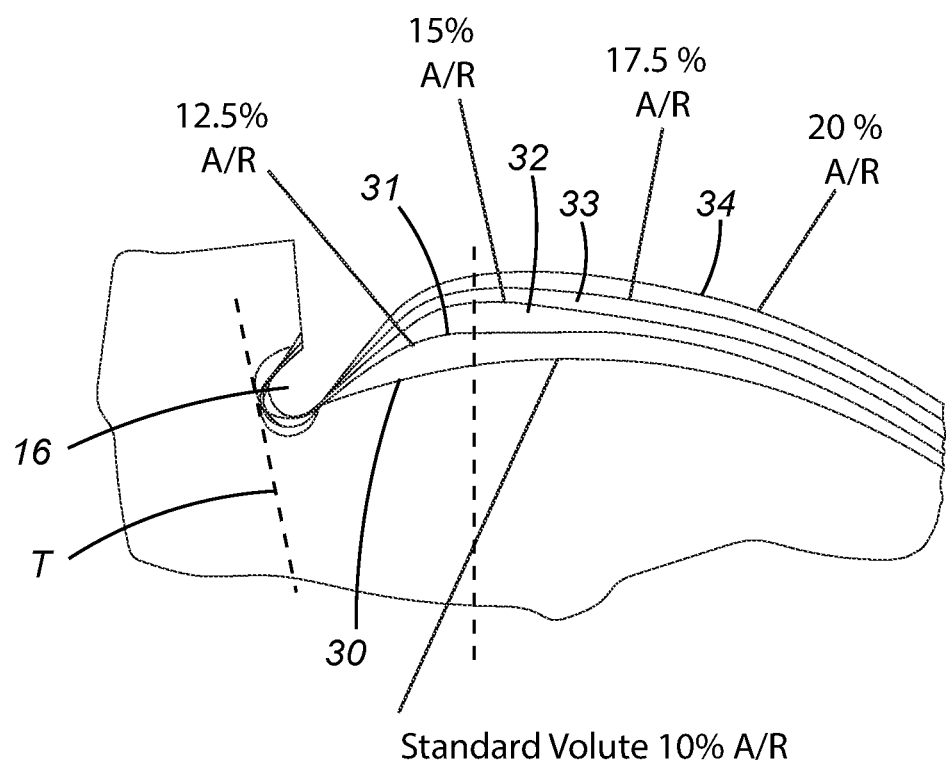
Fig. 7

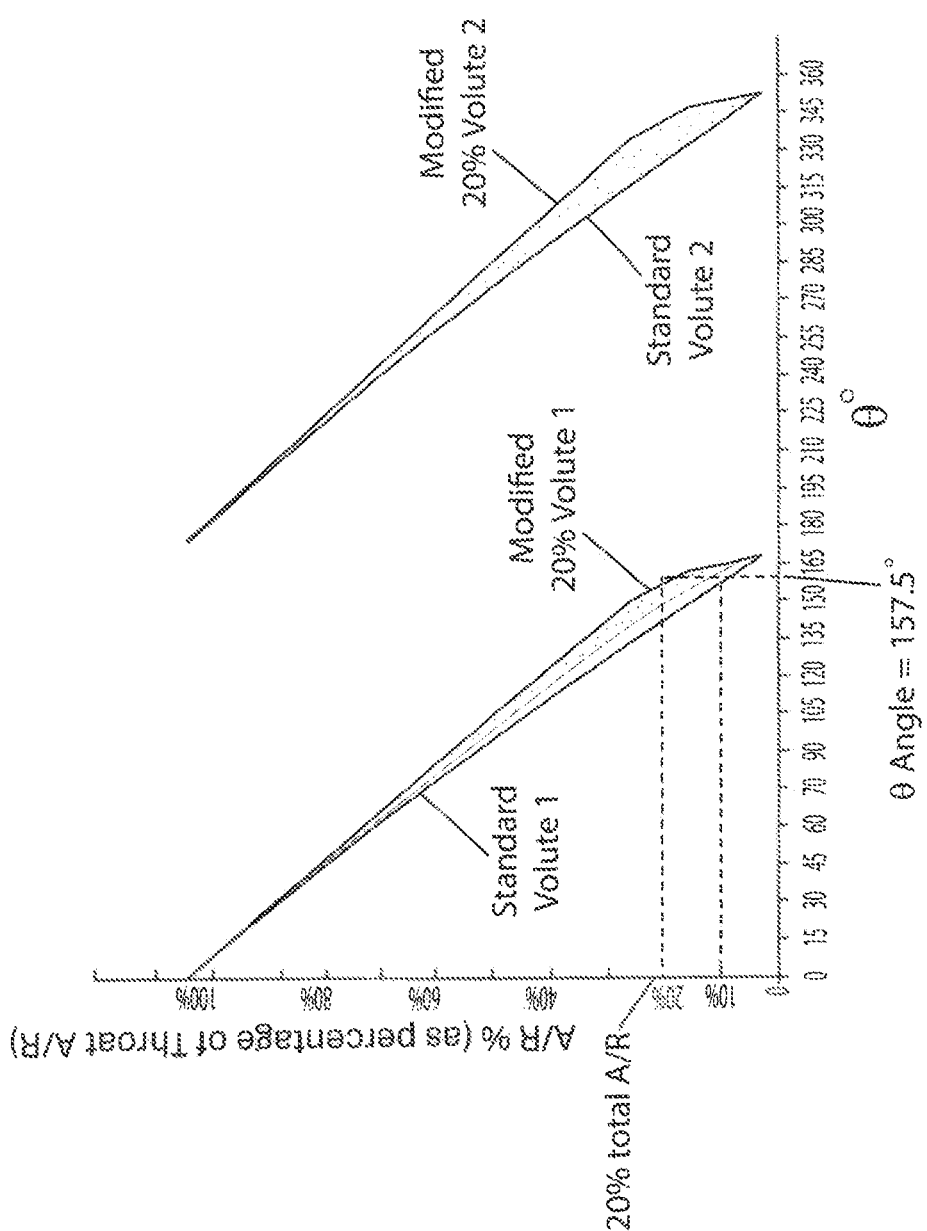
Fig. 8

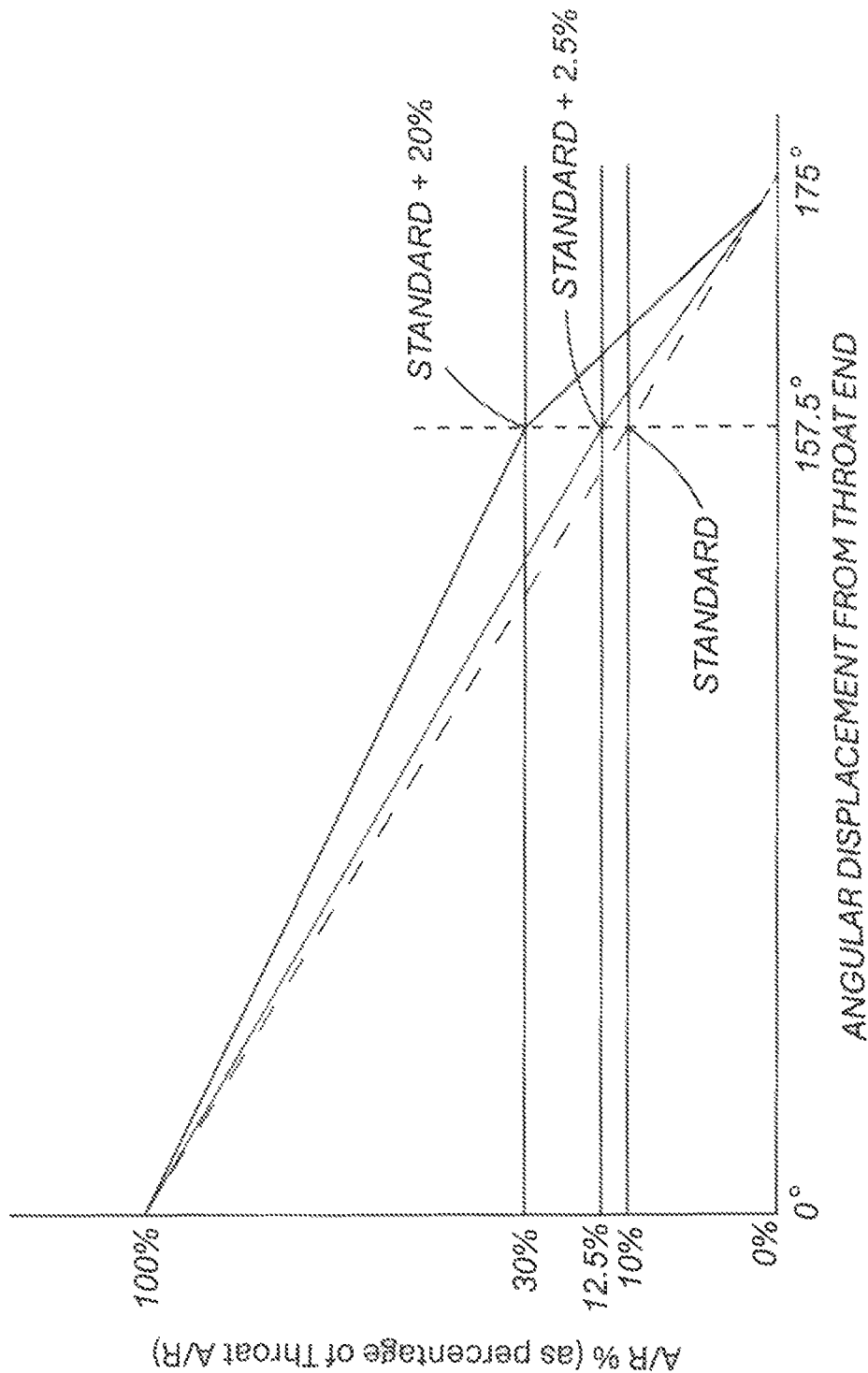
Fig. 9

METHOD OF REDUCING TURBINE WHEEL HIGH CYCLE FATIGUE IN SECTOR-DIVIDED DUAL VOLUTE TURBOCHARGERS

CROSS-REFERENCE TO RELATED APPLICATIONS

This application claims priority pursuant to 35 U.S.C. 119(a) to U.S. Patent Application No. 63/236,017, filed Aug. 23, 2021, which application is incorporated herein by reference in its entirety.

FIELD

In sector-divided turbine housings, two volutes, each feeding exhaust flow to a different circumferential sector, end in respective tongues, for example a first and a second tongue. As the turbine wheel rotates, each blade is excited to vibrate once as it passes the first tongue, and then again as it passes the second tongue. Experiments have suggested that turbine wheels in such dual volute turbine housings are more susceptible to high cycle fatigue (HCF) due to increased pressure differential at the tongue and the increased frequency of excitation. This problem, though often addressed, remains in need of a simple and efficient solution. The present invention provides this solution and prolongs turbine wheel life.

BACKGROUND OF THE INVENTION

In an internal combustion engine, expanding hot combustion gasses push against pistons, and thermal energy is converted into kinetic energy. Most internal combustion engines average only around 20 percent thermal efficiency. Unused thermal and kinetic energy is released as waste through the engine exhaust and cooling systems.

Turbochargers may be used to capture some of this waste energy. Exhaust gas is directed at high velocity and pressure onto a turbine wheel, driving the wheel at speeds as high as 300,000 RPM. The turbine wheel is coupled to and drives a compressor wheel of a compressor. The compressor draws in fresh air, compresses it, and supplies this compressed air to an engine intake, allowing more fuel to be combusted in the cylinders, thus boosting the horsepower of the engine.

In the case that an exhaust manifold fluidically coupling the engine to the turbocharger collects all exhaust flow into a single conduit before rea, exhaust gas reaches the turbine at a relatively constant pressure, and the turbine primarily converts a congestion pressure of the exhaust gas into a rotational movement. In an alternative known to "pulse charging" energy present in the gas pulses is additionally harnessed to drive the turbine.

More specifically, at the internal combustion engine, exhaust gasses are released from the cylinders as discrete pulses. That is, in the exhaust stroke, as the exhaust port opens, hot exhaust gas is forcibly expelled as a pulse. The pulse travels along the exhaust manifold as a dynamic wave, enters the turbine housing volute, and impinges onto the turbine wheel (FIG. 1), where heat and pressure in the exhaust gasses are converted to rotational mechanical energy. In a The dynamic wave contains an extra pulse of pressure which can start the turbine spinning with less delay and thus be helpful in reducing turbo lag. In a pulse energy driven turbine, pressure at the turbine inlet is raised to a high value very soon after exhaust valve opening, and then decreases to a much lower value as the cylinder empties, until another exhaust valve opening causes pressure to rapidly increase again. In a multi-cylinder engine, to maintain "pulse separation", engine cylinders are divided into subgroups, with each subgroup assigned a different exhaust manifold. The turbocharger volute is also divided into multiple substantially separate volutes, with each manifold section supplying a different volute section.

Division of the volute may be meridional ("twin volute") or sector ("dual volute" as shown in FIG. 1). The present invention is concerned with turbochargers with sector divided dual volute turbine housings where each volute narrows in a snail-shell fashion with the intent to evenly distribute exhaust feed circumferentially about its respective sector of the wheel. Two exhaust manifolds may supply the turbine housing tangentially from the same side (FIG. 1) or from opposite sides of the turbine housing. Each volute ends in a tongue. As the blades of the turbine wheel pass each tongue, they are bent or "excited" by pressure discontinuities, causing the blade to vibrate in the way a tuning fork will vibrate when struck. This is referred to as "blade pass excitation".

While sector divided dual volutes offer efficient pulse energy extraction, the two-tongue structure is a source of a particular excitation problem. As the turbine wheel rotates, each turbine blade is excited to vibrate once as it passes the first tongue, and then again as it passes the second tongue. If the wheel is not stiff enough to have a resonant frequency higher than the excitation introduced by the first tongue, then the excitation caused by second tongue can build on it, and increase the amplitude of the excitation. With two tongues, not only is there a doubling of the number of excitations per revolution of the turbine wheel, but also a doubling of the frequency. So, unlike a single volute turbine housing where there is one blade pass per revolution and thus a) there is more time/rotation to damp out the excitation and b) higher rotational speeds would be required to excite higher orders of vibration, with two tongues both excitation energy and excitation frequency are doubled. The excitation frequency will at some point match the blade's resonant frequency, causing the amplitude of vibration to increase significantly. As the blade vibrates or "rings", the amplitude of the bending results in strains that are confined mainly to the elastic portion of the stress strain curve. The blade can withstand such alternating stresses for a long time without breaking, but sooner or later it will fail. This is known as high cycle fatigue (HCF).

Another form of vibration, in radial-entry-axial-exhaust turbines, occurs at the turbine wheel backwall. In a radial entry turbine the hub between the blades is curved to help redirect exhaust gas flow from a radial inflow direction to an axial outflow direction. Particularly in "pulse turbocharging", the turbine wheel experiences an axial push-back as it redirects pulse energy. This can help introduce excitation into the turbine wheel backwall.

As the pursuit of improved aerodynamic performance on turbochargers continues to push the boundaries of mechanical design, the risk of HCF failures of turbine wheels is amplified, and is often the limiting factor on the durability of a turbocharger.

One conventional approach to reducing HCF involves increasing the mass of the blades for general damping of vibration. However, any increase in mass decreases the turbocharger's performance. Thickening the turbine blades increases inertial lag and decreases efficiency and transient response.

JP5870083B suggests turbine efficiency may be improved by redesigning the scroll part of the turbine, considering exhaust pulsation. The scroll part of the turbine is configured so that the ratio A/R at least partially has a concave distribution in a graph with the horizontal axis representing a circumferential position around the axis of the turbine rotor blade and the vertical axis representing the ratio A/R.

U.S. Pat. Nos. 10,378,369 and 10,781,704 also teach a turbine housing wherein when A is a flow-path cross-sectional area of the scroll part, and R is a distance from a centroid of a flow-path cross-section of the scroll part to a rotational axis of the turbine rotor blade, the scroll part is configured so that a first graph, having a horizontal axis (abscissa) representing an angular position θ in a circumferential direction of the scroll part and a vertical axis (ordinate) representing ratio A/R of the flow-path cross-sectional area A to the distance R, at least partially has a concave distribution.

U.S. Pat. No. 10,513,936 teaches a turbocharger system comprising: a turbine wheel configured to rotate about an axis of rotation; and a turbine housing that houses the turbine wheel, the turbine housing defining at least one scroll with a volute flow passage, the volute flow passage having an inlet and an end that are spaced apart along a flow axis in a circumferential direction about the axis of rotation; the volute flow passage defining a plurality of cross sections arranged in series along the flow axis from the inlet to the end, the plurality of cross sections taken normal to the flow axis, the plurality of cross sections having an area (A), a centroid spaced at a radial distance (R) from the axis of rotation, and a sidewall angle; the volute flow passage having a sidewall angle distribution from the inlet to the end that is at least partly nonlinear; the volute flow passage having an A/R-distribution from the inlet to the end that is substantially linear; and the volute flow passage having an A-distribution from the inlet to the end that is at least partly nonlinear. See FIG. 3 of this document illustrating a progression of centroids in a volute for an A/R-distribution from the inlet to the end that is substantially linear.

Taking another approach, U.S. Pat. No. 10,487,676 (Hughes) teaches a turbine housing comprising a cavity for a turbine wheel, the cavity defining a turbine axis about which the turbine wheel rotates in use, and an inlet volute. The turbine may be used for pulse charging. A tongue projects between, and acts to partition, the second end of the volute passage from a part of the passage immediately radially adjacent thereto. The tongue can be considered to separate at least the end of the radially innermost 'coil' of the passage (i.e. at least the second end of the passage) from the penultimate coil. The tongue terminates in a longitudinally distal tip, which is conventionally positioned radially adjacent to the turbine wheel to provide minimal clearance therewith, and acts to direct working fluid in the second end of the passage into the turbine wheel. A/R decreases linearly around the turbine axis (see Hughes FIG. 5). Problems can arise in the region of the tongue tip. As working fluid running along the volute passage passes the tip of the tongue there is a sudden increase in the area of the passage and the shape of that area (since the tongue no longer occupies any space in the passage). This can lead to a sudden change in the A/R and therefore in the swirl angle. This localized change in swirl angle can create a localized area of high/low force on the turbine wheel around its circumference. This, in turn, can induce vibration of the turbine wheel and/or lead to premature failure (for instance from fatigue due to a point on the turbine undergoing increased cyclic loading as it continually travels around the turbine axis and through the localized region). According to Hughes, the tongue tip lateral centerline should be arranged offset relative to the line of passage, whereby the total cross sectional area of the tongue tip may be reduced, which may in turn reduce the fluctuations in A/R across the tongue. This may allow the force applied to the turbine by the fluid to be more constant, which may improve turbine efficiency and/or reduce turbine wheel fatigue. According to Hughes A/R decreases linearly around the turbine axis (see Hughes FIG. 5, reproduced here as prior art FIG. 4, where the dark line represents a conventional volute and the dashed lines represent improved volutes).

It is an object of the present invention to provide a method of reducing HCF of turbine wheels.

BRIEF SUMMARY OF THE INVENTION

The invention is based on the discovery that modifying design of the volutes of a multi-volute turbine housing in a counter-intuitive manner can actually lessen the excitation of turbine wheels and counter the problem of HCF.

That is, it is conventional wisdom that, as exhaust gas flows in the volute around the circumference of the turbine, it should be fed evenly and consistently from volute to turbine wheel, and that this should be done by evenly and consistently reducing the cross-sectional area of the volute as it spirals around the turbine wheel, i.e. A/R decreasing linearly around the turbine axis. Those working in this art would expect that deviating from this design by "inflating" the volume of the volute just upstream of the tongue would produce an inconsistency, and increase the pressure differential at the tongue, since, first, the angle at which the tongue directs flow onto the turbine wheel would be greater, and secondly, the increased volume of gas in the inflated terminal section of volute would be expected to feed the throat at a different rate than the conventional volute with linearly decreasing A/R.

The present inventors have discovered however that by locally increasing the cross-sectional area of the volute just upstream of the tongues, surprisingly, a reduction in the force function of the exhaust gas pressure onto the turbine wheel blades in the vicinity of the tongues results, and thus a decrease in excitation of the blades.

By the inventive change in the volute geometry, the pressure fluctuation experienced by the turbine wheel blades as they pass the tongues can be reduced. This will reduce excitation at the critical frequencies which would otherwise lead to HCF failures.

These and other features, aspects and advantages of the present invention will become better understood with reference to the following drawings, description and claims.

BRIEF DESCRIPTION OF THE SEVERAL VIEWS OF THE DRAWINGS

The present disclosure will hereinafter be described in conjunction with the following drawing figures, wherein like numerals denote like elements, and wherein:

FIG. 1 shows an in-line four cylinder internal combustion engine with exhaust flow separation maintained through exhaust manifolds to a pulse driven sector-divided dual volute turbine housing with linearly decreasing A/R;

FIG. 2 shows a turbine wheel with an exaggerated vibration at the blade leading edge and wheel backwall;

FIG. 3 shows measurement of A, centroid and R;

FIG. 4 is a plot of A/R decreasing linearly according to prior art;

FIG. 5 is a plot of A/R decreasing linearly according to prior art and decreasing concavely according to prior art;

FIG. 6 shows a prior art dual volute turbine housing with axis of rotation of wheel, volute centroids and radius measured between the two;

FIG. 7 shows the inventive modification of the volute in the vicinity of the tongue compared to a standard volute;

FIG. 8 is a plot of A/R vs θ for an inventive dual volute turbine housing; and

FIG. 9 illustrates the initial step in the process of modifying the design of a turbine.

DETAILED DESCRIPTION OF THE INVENTION

In the following one particular dual volute turbine wheel and turbine housing will be discussed in greater particularity for illustrative purposes as it relates to one particular design, but it will be apparent that the invention is applicable to alternative engine configurations, wheel families and turbine housings.

As diagrammatically illustrated in FIG. 1, the invention relates to reduction of HCF in a turbine wheel (2) in a sector-divided turbine housing (4) (two-scroll, two-tongue) for an exhaust-gas turbocharger system (1) as illustrated in FIG. 1. In this illustrative embodiment, the engine (8) has four cylinders ($C_1$, $C_2$, $C_3$, $C_4$), which release pulses of exhaust gas into a dual exhaust manifold (7). In a typical in-line four-cylinder engine, the firing order is 1-3-4-2, meaning that the first cylinder $C_1$ combusts first, then the third cylinder $C_3$ combusts second, then the fourth cylinder $C_4$ combusts third, and the second cylinder $C_2$ combusts fourth. Two cylinders ($C_1$, $C_4$) are fluidically coupled to a first exhaust manifold pipe (9), and two cylinders ($C_2$, $C_3$) are fluidically coupled to a second exhaust manifold (10). The exhaust manifolds have flanges (11, 13) via which they are coupled to turbocharger turbine housing flange (13) with maintenance of continuity of separate exhaust flow channels and thus separation of exhaust pulses (15). By fluidically coupling the first and fourth cylinders ($C_1$, $C_4$) together and coupling the second and third cylinders ($C_2$, $C_3$) together, the exhaust pulses released from each cylinder are separated by a maximum amount for the configuration. Stated differently, after the exhaust pulse from the first cylinder $C_1$ enters the first exhaust manifold pipe (9), there is a pause before the exhaust pulse from the fourth cylinder $C_4$ enters the first exhaust manifold (9) because the exhaust pulse from the third cylinder $C_3$ first enters the second exhaust manifold (10). Likewise, after the exhaust pulse from the fourth cylinder $C_4$ enters the first exhaust manifold pipe (9), there is a pause before the exhaust pulse from the first cylinder $C_1$ enters the first exhaust manifold (9) because the exhaust pulse from the second cylinder $C_2$ first enters the second exhaust manifold (10). These pauses result in separation between pulse energies in the exhaust manifolds (9, 10) such that interference between adjacent exhaust pulses in a manifold is reduced. The pulses from the third and fourth cylinders (C3, C4) are similarly separated. The turbine housing (4) has at least two symmetric or asymmetric flow channels (5, 6) that are fluidically substantially separate and can be flowed through by the exhaust gas. The two manifolds preferably deliver opposite and equal firing pulsations (15) to improve turbine efficiency and reduce manifold complexity. A turbine wheel (2) that is rotatably accommodated in the turbine housing (4) can be driven by the exhaust gas impinging on the of the turbine wheel having outer diameter (14). Twin-scroll turbo systems may have higher backpressure at low rpm (which may help turbo spool-up) and lower backpressure at high rpm (which may help top-end performance).

The multiple volutes (5, 6) channel the exhaust gas so that it is introduced generally evenly along the outer diameter (14) of the turbine wheel (2) and expands in the turbine wheel (14) whereby the turbine wheel may convert the exhaust gas into rotational mechanical energy. The pressure and temperature drop is converted into kinetic energy.

From an energy extraction perspective, it is desirable to keep the gap between tongues (16, 17) and turbine wheel as small as possible. However, as each blade of the rotating turbine wheel passes close to the flow obstruction formed by the tongues (16, 17), pressure variations impart an excitation to the blade, causing the blade to vibrate, in the way a tuning fork will vibrate when struck. If the tongues (16, 17) are positioned closer to the turbine wheel, the pressure variations increase, resulting in a greater excitation and therefore greater vibration of the blade. Moreover, with two tongues, each blade will experience two of these excitations per revolution.

As illustrated in FIG. 2, in such a turbocharger with sector-divided dual volute turbine housing, when aerodynamic forces act on the turbine blades (20), the blades are deflected from their static shape, being bent backwards and forwards. The accumulation of vibrational energy without an adequate dissipation mechanism can lead to increasing amplitude of vibration. Repeated bending or deflection leads to material fatigue, cracking and an ultimate fracture, referred to as high cycle fatigue (HCF) failures. HCF is characterized by low amplitude high frequency elastic strains. HCF is a type of fatigue caused by small elastic strains under a high number of cycles before failure occurs.

Particularly in "pulse turbocharging", the turbine wheel experiences an axial push-back as it redirects pulse energy. This can help introduce excitation into the turbine wheel backwall (21). The turbine and turbine wheels according to the present invention are specifically designed to harness pulse energy and convert it to rotational velocity. Thus, the conversion of pressure and velocity from the exhaust gas for a pulse flow turbine wheel in a divided turbine housing is greater than the conversion of pressure and velocity from a steady state exhaust flow to the turbine wheel velocity.

The present invention is based on the discovery that "inflating" the volume of the volute passage just upstream of the tongue—a modification that might be expected to produce an increased pressure differential at the tongue—actually results in a reduction in the force function of the exhaust gas pressure onto the turbine wheel blades in the vicinity of the tongues results, and thus a decrease in excitation of the blades.

The basic terminology used to define the present invention will now be discussed in greater detail.

While technically the term "volute" may refer to either a physical structure of a component of the turbine housing, or the space within the structure through which exhaust gas flows, the term "volute" or "volute passage" as used herein will refer to the space within the structure.

For simplicity the term "A/R" is first explained using a single volute turbine housing as shown in FIG. 3. Building on the single volute explanation, the invention will then be explained as regards to a dual volute turbine housing as shown in in FIG. 6.

In FIG. 3 a prior art turbine housing mates fluidically to an exhaust pipe at a turbine foot. The turbine housing foot is usually of a standard design as it mates to exhaust manifolds of many engines. The foot can be located at any angle to, or position relative to, the snail-shell like "volute". The transition from the foot gas passage 25 to the volute is executed in a manner which provides the best aerodynamic and mechanical compromise. A cross section through the passage where the foot passage transitions into the volute is shown as "A". The turbine housing includes a cavity adapted to house a turbine wheel 2 rotatable about an axis of rotation 22. The volute includes a volute passage spiraling radially inwards about the turbine axis from a first end to a second end. The volute is designed to deliver exhaust flow from the engine in a uniform manner from the volute to a vortex centered on the turbine wheel axis. The volute passage ends at a tongue terminating at a tongue tip. The volute passage and tongue tip cooperatively define an inlet area feeding exhaust gas to the blades of the turbine wheel.

The widely used term A/R when used to define a turbine housing represents the ratio of the area at volute inlet slice "A" divided by R, the distance from the centroid of the shaded flow area 23 (in mm$^2$) to the turbine wheel axis of rotation 22 (in mm). For example, a section of volute having an area of 509.27 mm$^2$ and a radius of 48.5 would have an A/R of 509.27/48.5=10.5. The formula could alternatively be written A/R/D or A/(RD) taking turbine wheel diameter into account; however, when discussing only one particular wheel diameter, reference need only be made to A/R, it is simple to then divide that value by the wheel diameter to reach the nondimensionalized version of the value.

In order to keep flow attached to the volute walls and to keep the shape of the volute appropriate to the function of the volute, an A/R schedule for the turbine housing of FIG. 3 is plotted, as shown in FIG. 4, to ensure that there exist no inappropriate changes in section. According to the conventional understanding, the cross-sectional area of the volute is at a maximum at the inlet radially outward of the tongue measured normal or perpendicular to the direction of flow, and should gradually and continuously decrease until it becomes minimal (considering the small space provided between tongue and turbine wheel to prevent contact) as the tongue terminates near the wheel. The tongue projects between, and acts to partition, the second end of the volute passage from a part of the inlet or foot passage immediately radially adjacent thereto. The tongue terminates in a longitudinally distal tip, which is conventionally positioned radially adjacent to the turbine wheel to provide minimal clearance therewith, and acts to direct working fluid in the second end of the passage into the turbine wheel. As exhaust gas running along the volute passage passes the tip of the tongue there is a sudden increase in the area of the passage and the shape of that area (since the tongue no longer occupies any space in the passage). This leads to a sudden change in the A/R as shown in the left part of the graph (see FIG. 4, dark line). Thereafter, A/R decreases linearly around the turbine axis. That is, with increasing angular displacement from the tongue, A/R decreases directly proportionately.

FIG. 5 shows an A/R with a concave distribution according to prior art U.S. Pat. Nos. 10,378,369 and 10,781,704. A is a flow-path cross-sectional area of the scroll part (volute), and R is a distance from a centroid of a flow-path cross-section of the scroll part to a rotational axis of the turbine rotor blade. The scroll part is configured so that a first graph, having a horizontal axis (abscissa) representing an angular position θ in a circumferential direction of the scroll part and a vertical axis (ordinate) representing ratio A/R of the flow-path cross-sectional area A to the distance R, at least partially has a concave distribution.

FIG. 6 illustrates a dual volute turbine housing with foot passages 26, 27 transitioning to volutes 5, 6 with a maximum volute area A radially outward of tongue tips 16, 17. Each area A has a centroid. With increasing angular displacement from the volute inlet, the volute cross sectional area can be calculated, and from this, the centroid. One of the centroids 28 of volute 5 is shown in FIG. 6, and the distance from the axis of rotation 22 of the turbine wheel 2 to the centroid 28 is the radius R. One of the centroids 29 of volute 6 is shown, and the distance from the axis of rotation 22 of the turbine wheel 2 to the centroid 29 is the radius R. Since the decrease in A/R is linear, the illustrated turbine has conventional volutes 6, 7.

According to the present invention as illustrated in FIG. 7, the terminal part of the volute just upstream of the tongue is "inflated" compared to a conventional volute. FIG. 7 illustrates superimposed tongues and outer boundaries of a standard volute 30 and four inventive volutes 31, 32, 33 and 34 just upstream of the tongue. It is apparent that the distance of the outer wall of the standard volute 30 decreases gradually and continuously from the right side of this illustration all the way to line T which is the radial through the tip of the tongue 16. Dual volutes are frequently asymmetric, e.g., one volute extends 175° and the other extends 185° around the turbine wheel. For volute in which A/R decreases linearly, for a 175° volute this would mean a 10% change in A/R for every 10% of change in volute, i.e., every 17.5°. Drawing a straight line from maximum A/R of 100% (10.5 A/R in the Examples) to a minimum A/R at the tongue and continuing the line as an imaginary line to 175° at which the volute ends and the value corresponds to 0% of maximum A/R. At a position at which A/R of the imaginary line would be 10% of maximum A/R, θ would be 10% of total volute angle upstream of 175°, or 175° minus 17.5°, or 157.5°. See FIG. 9 showing the process of designing a 175° volute. At 157.5° (total volute arc minus 10% of arc), represented by vertical dash line, this line intersects the hypothetical straight line (linear progression A/R) at 10% of maximum A/R (10% of 10.5 A/R in the examples would be 1.05 A/R). Also shown in FIG. 9 is inventive convex reference shape for curve at 157.5° representing standard A/R+2.5% of maximum A/R, or 12.5% of total maximum A/R, in this example A/R 1.31. Also shown in FIG. 9 is inventive convex reference shape for curve at 157.5° representing standard A/R+20% of maximum A/R, or 30% of total maximum A/R, in this example A/R 3.15.

According to the invention, two key parameters can be varied: 1) the amount of local A/R increase compared to standard (preferably 2.5-20% increase in A/R as a percentage of total A/R at the throat), and 2) the angle at which the A/R starts to decline, i.e., the angle at which the tongue approaches the wheel. Of course, the physical appearance of such an A/R is manifest in the novel shape of the volute wall, the volute being "inflated" just upstream of the tongue.

According to the invention, A/R is increased at least 2.5%, and increased as much as 20%, over the straight line A/R, at a θ determined one of two ways. In FIGS. 7 and 8 A/R is illustrated increased from an additional 2.5% over straight line (so 12.5% maximum A/R) to an additional 10% (so 20% maximum A/R). An increase of 20% is possible but not shown (so 30% maximum A/R).

First, calculate maximum A of the flow-path cross-sectional area of the volute in mm$^2$ taken normal to the flow axis. Determine R, the distance from a centroid of a volute cross-section of the volute to the turbine wheel axis of rotation in mm. Plot A/R on a graph having a horizontal axis representing displacement from an angular position θ in a circumferential direction of the volute and a vertical axis representing a ratio A/R of the flow-path cross-sectional area. Plot a maximum A/R in a plane containing the turbine axis and the tongue tip as 100% at angular position $\theta_{max\ A/R}$ of 0°. Plot the minimal A/R at which the tongue tip is closest to the cavity for the turbine wheel at $\theta_{max\ A/R}$, draw a straight line from $\theta_{max\ A/R}$ through $\theta_{max\ A/R}$ and continue the line to 0% A/R, which is the hypothetical end of the volute, e.g., 175° in the examples (which is theoretical not actual because the tongue does not actually touch the wheel).

Subtract 10% of the volute length)(17.5°) from the total volute length)(175°) and mark this θ (157.5° in the examples). At the volute length minus 10% draw a vertical line. This vertical line will intersect the standard line at 10% maximum A/R. On this vertical line, increase total A/R by 2.5 to 20%.

The second way to determine where to plot the point determinative of the inventive curve is to draw the standard line as explained above, then determine the θ at which the straight line crosses 10% of maximum A/R, and at this θ increase the A/R by 2.5-20% of maximum A/R. The result will be the same.

For additional explanation as to design of turbocharger turbine housing volutes, reference is made to U.S. Pat. Nos. 8,585,355 and 10,301,952, the disclosures of which are incorporated herein by reference.

The invention will now be explained using illustrative concrete embodiments. The invention is in no way limited to these examples.

Example 1 12.5%

| Θ [°] | A/R (Θ) [mm] | A (Θ) [mm²] | rs (Θ) [mm] |
|---|---|---|---|
| 0.00 | 10.50 | 509.27 | 48.50 |
| 10.98 | 9.87 | 470.71 | 47.69 |
| 21.97 | 9.24 | 432.95 | 46.86 |
| 32.95 | 8.61 | 396.03 | 46.01 |
| 43.93 | 7.98 | 359.95 | 45.12 |
| 54.91 | 7.35 | 324.74 | 44.20 |
| 65.90 | 6.72 | 290.44 | 43.25 |
| 76.88 | 6.09 | 257.06 | 42.24 |
| 88.16 | 5.44 | 223.27 | 41.06 |
| 99.44 | 4.79 | 190.72 | 39.81 |
| 110.71 | 4.14 | 159.53 | 38.51 |
| 121.99 | 3.50 | 129.81 | 37.14 |
| 133.27 | 2.85 | 101.74 | 35.73 |
| 144.55 | 2.20 | 75.47 | 34.30 |
| 155.82 | 1.55 | 51.11 | 32.92 |
| 158.87 | 1.38 | 44.86 | 32.57 |
| 161.91 | 1.07 | 34.29 | 31.96 |
| 164.96 | 0.69 | 21.59 | 31.24 |
| 168.00 | 0.31 | 9.46 | 30.55 |
| 175.00 | 10.50 | 509.27 | 48.50 |
| 186.67 | 9.87 | 470.71 | 47.69 |
| 198.34 | 9.24 | 432.95 | 46.86 |
| 210.01 | 8.61 | 396.03 | 46.01 |
| 221.68 | 7.98 | 359.95 | 45.12 |
| 233.35 | 7.35 | 324.74 | 44.20 |
| 245.02 | 6.72 | 290.44 | 43.25 |
| 256.69 | 6.09 | 257.06 | 42.24 |
| 268.67 | 5.44 | 223.27 | 41.06 |
| 280.65 | 4.79 | 190.72 | 39.81 |
| 292.63 | 4.14 | 159.53 | 38.51 |
| 304.61 | 3.50 | 129.81 | 37.14 |
| 316.60 | 2.85 | 101.74 | 35.73 |
| 328.58 | 2.20 | 75.47 | 34.30 |
| 340.56 | 1.55 | 51.11 | 32.92 |
| 343.67 | 1.38 | 45.10 | 32.58 |
| 346.78 | 1.09 | 34.85 | 32.00 |
| 349.89 | 0.70 | 21.86 | 31.26 |
| 353.00 | 0.31 | 9.46 | 30.55 |

Example 2 15%

| Θ [°] | A/R (Θ) [mm] | A (Θ) [mm²] | rs (Θ) [mm] |
|---|---|---|---|
| 0.00 | 10.50 | 509.27 | 48.50 |
| 10.98 | 9.87 | 470.71 | 47.69 |
| 21.97 | 9.24 | 432.95 | 46.86 |
| 32.95 | 8.61 | 396.03 | 46.01 |
| 43.93 | 7.98 | 359.95 | 45.12 |
| 54.91 | 7.35 | 324.75 | 44.20 |
| 65.90 | 6.72 | 290.44 | 43.25 |
| 76.88 | 6.09 | 257.07 | 42.24 |
| 88.16 | 5.44 | 223.38 | 41.06 |
| 99.44 | 4.79 | 190.93 | 39.82 |
| 110.71 | 4.15 | 159.83 | 38.52 |
| 121.99 | 3.50 | 130.19 | 37.16 |
| 133.27 | 2.86 | 102.18 | 35.75 |
| 144.55 | 2.21 | 75.96 | 34.33 |
| 155.82 | 1.55 | 51.11 | 32.92 |
| 158.87 | 1.24 | 40.10 | 32.30 |
| 161.91 | 0.93 | 29.50 | 31.69 |
| 164.96 | 0.62 | 19.29 | 31.11 |
| 168.00 | 0.31 | 9.46 | 30.55 |
| 175.00 | 10.50 | 509.27 | 48.50 |
| 187.01 | 9.87 | 470.71 | 47.69 |
| 199.02 | 9.24 | 432.95 | 46.86 |
| 211.04 | 8.61 | 396.03 | 46.01 |
| 223.05 | 7.98 | 359.95 | 45.12 |
| 235.06 | 7.35 | 324.75 | 44.20 |
| 247.07 | 6.72 | 290.44 | 43.25 |
| 259.09 | 6.09 | 257.07 | 42.24 |
| 271.38 | 5.44 | 223.39 | 41.06 |
| 283.67 | 4.79 | 190.94 | 39.82 |
| 295.97 | 4.15 | 159.84 | 38.52 |
| 308.26 | 3.50 | 130.20 | 37.16 |
| 320.56 | 2.86 | 102.19 | 35.75 |
| 332.85 | 2.21 | 75.98 | 34.33 |
| 345.14 | 1.55 | 51.11 | 32.92 |
| 347.11 | 1.24 | 40.10 | 32.30 |
| 349.07 | 0.93 | 29.50 | 31.69 |
| 351.04 | 0.62 | 19.29 | 31.11 |
| 353.00 | 0.31 | 9.46 | 30.55 |

Example 3 17.5%

| Θ [°] | A/R (Θ) [mm] | A (Θ) [mm²] | rs (Θ) [mm] |
|---|---|---|---|
| 0.00 | 10.50 | 509.27 | 48.50 |
| 11.64 | 9.87 | 470.72 | 47.69 |
| 23.29 | 9.24 | 432.98 | 46.86 |
| 34.93 | 8.61 | 396.06 | 46.01 |
| 46.58 | 7.98 | 360.00 | 45.12 |
| 58.22 | 7.35 | 324.80 | 44.20 |
| 69.87 | 6.72 | 290.51 | 43.25 |
| 81.51 | 6.09 | 257.14 | 42.25 |
| 92.94 | 5.47 | 224.83 | 41.12 |
| 104.36 | 4.85 | 193.66 | 39.93 |
| 115.79 | 4.23 | 163.70 | 38.69 |
| 127.22 | 3.61 | 135.08 | 37.39 |

-continued

| Θ [°] | A/R (Θ) [mm] | A (Θ) [mm²] | rs (Θ) [mm] |
|---|---|---|---|
| 138.64 | 2.99 | 107.93 | 36.05 |
| 150.07 | 2.38 | 82.39 | 34.69 |
| 161.49 | 1.55 | 51.11 | 32.92 |
| 163.12 | 1.24 | 40.10 | 32.30 |
| 164.75 | 0.93 | 29.50 | 31.69 |
| 166.37 | 0.62 | 19.29 | 31.11 |
| 168.00 | 0.31 | 9.46 | 30.55 |
| 175.00 | 10.50 | 509.27 | 48.50 |
| 187.37 | 9.87 | 470.72 | 47.69 |
| 199.74 | 9.24 | 432.98 | 46.86 |
| 212.12 | 8.61 | 396.07 | 46.01 |
| 224.49 | 7.98 | 360.00 | 45.12 |
| 236.86 | 7.35 | 324.80 | 44.20 |
| 249.23 | 6.72 | 290.51 | 43.25 |
| 261.61 | 6.09 | 257.15 | 42.25 |
| 273.73 | 5.47 | 224.87 | 41.12 |
| 285.86 | 4.85 | 193.72 | 39.93 |
| 297.99 | 4.23 | 163.80 | 38.69 |
| 310.11 | 3.62 | 135.21 | 37.40 |
| 322.24 | 3.00 | 108.08 | 36.06 |
| 334.37 | 2.38 | 82.56 | 34.70 |
| 346.49 | 1.55 | 51.11 | 32.92 |
| 348.12 | 1.24 | 40.10 | 32.30 |
| 349.75 | 0.93 | 29.50 | 31.69 |
| 351.37 | 0.62 | 19.29 | 31.11 |
| 353.00 | 0.31 | 9.46 | 30.55 |

Example 4 20%

| Θ [°] | A/R (Θ) [mm] | A (Θ) [mm²] | rs (Θ) [mm] |
|---|---|---|---|
| 0.00 | 10.50 | 509.27 | 48.50 |
| 12.00 | 9.87 | 470.73 | 47.69 |
| 24.01 | 9.24 | 433.01 | 46.86 |
| 36.01 | 8.61 | 396.11 | 46.01 |
| 48.02 | 7.98 | 360.05 | 45.12 |
| 60.02 | 7.35 | 324.87 | 44.21 |
| 72.02 | 6.72 | 290.58 | 43.25 |
| 84.03 | 6.09 | 257.23 | 42.25 |
| 95.23 | 5.50 | 226.48 | 41.18 |
| 106.43 | 4.91 | 196.75 | 40.05 |
| 117.64 | 4.32 | 168.12 | 38.88 |
| 128.84 | 3.74 | 140.68 | 37.66 |
| 140.04 | 3.15 | 114.54 | 36.39 |
| 151.24 | 2.56 | 89.83 | 35.09 |
| 162.45 | 1.55 | 51.11 | 32.92 |
| 163.84 | 1.24 | 40.10 | 32.30 |
| 165.22 | 0.93 | 29.50 | 31.69 |
| 166.61 | 0.62 | 19.29 | 31.11 |
| 168.00 | 0.31 | 9.46 | 30.55 |
| 175.00 | 10.50 | 509.27 | 48.50 |
| 187.75 | 9.87 | 470.73 | 47.69 |
| 200.51 | 9.24 | 433.01 | 46.86 |
| 213.26 | 8.61 | 396.11 | 46.01 |
| 226.02 | 7.98 | 360.05 | 45.12 |
| 238.77 | 7.35 | 324.87 | 44.21 |
| 251.53 | 6.72 | 290.59 | 43.25 |
| 264.28 | 6.09 | 257.23 | 42.25 |
| 276.16 | 5.50 | 226.54 | 41.18 |
| 288.04 | 4.91 | 196.86 | 40.06 |
| 299.92 | 4.33 | 168.28 | 38.89 |
| 311.80 | 3.74 | 140.88 | 37.67 |
| 323.68 | 3.15 | 114.78 | 36.40 |
| 335.57 | 2.57 | 90.09 | 35.11 |
| 347.45 | 1.55 | 51.11 | 32.92 |
| 348.84 | 1.24 | 40.10 | 32.30 |
| 350.22 | 0.93 | 29.50 | 31.69 |
| 351.61 | 0.62 | 19.29 | 31.11 |
| 353.00 | 0.31 | 9.46 | 30.55 |

Comparative Example Standard

| Θ [°] | A/R (Θ) [mm] | A (Θ) [mm²] | rs (Θ) [mm] |
|---|---|---|---|
| 0.00 | 10.50 | 509.27 | 48.50 |
| 11.16 | 9.89 | 471.99 | 47.72 |
| 22.31 | 9.28 | 435.31 | 46.92 |
| 33.47 | 8.66 | 399.07 | 46.08 |
| 44.62 | 8.03 | 363.20 | 45.20 |
| 55.78 | 7.40 | 327.61 | 44.28 |
| 66.93 | 6.75 | 292.29 | 43.30 |
| 78.09 | 6.09 | 257.27 | 42.25 |
| 88.28 | 5.47 | 225.08 | 41.13 |
| 98.46 | 4.85 | 193.43 | 39.92 |
| 108.65 | 4.21 | 162.50 | 38.64 |
| 118.84 | 3.56 | 132.52 | 37.27 |
| 129.03 | 2.90 | 103.77 | 35.83 |
| 139.22 | 2.23 | 76.54 | 34.36 |
| 149.41 | 1.55 | 51.11 | 32.92 |
| 154.05 | 1.24 | 40.13 | 32.30 |
| 158.70 | 0.93 | 29.54 | 31.69 |
| 163.35 | 0.62 | 19.32 | 31.11 |
| 168.00 | 0.31 | 9.46 | 30.55 |
| 175.00 | 10.50 | 509.27 | 48.50 |
| 186.82 | 9.89 | 471.99 | 47.72 |
| 198.64 | 9.28 | 435.31 | 46.92 |
| 210.46 | 8.66 | 399.07 | 46.08 |
| 222.28 | 8.03 | 363.20 | 45.20 |
| 234.10 | 7.40 | 327.61 | 44.28 |
| 245.92 | 6.75 | 292.29 | 43.30 |
| 257.74 | 6.09 | 257.27 | 42.25 |
| 268.53 | 5.47 | 225.08 | 41.13 |
| 279.33 | 4.85 | 193.43 | 39.92 |
| 290.12 | 4.21 | 162.50 | 38.64 |
| 300.91 | 3.56 | 132.52 | 37.27 |
| 311.71 | 2.90 | 103.77 | 35.83 |
| 322.50 | 2.23 | 76.54 | 34.36 |
| 333.30 | 1.55 | 51.11 | 32.92 |
| 338.22 | 1.24 | 40.13 | 32.30 |
| 343.15 | 0.93 | 29.54 | 31.69 |
| 348.07 | 0.62 | 19.32 | 31.11 |
| 353.00 | 0.31 | 9.46 | 30.55 |

See FIGS. 7-9. The Comparative Example (Standard Volute) is plotted as the lowest line and is shown as a straight line between end points. In FIG. 9 only one of the dual volutes is shown. The second volute would have slightly different shape, since a first volute of 175° would be complemented by a second volute of 185° for a total of 360°. approximately the same values, just add 180°. In FIG. 8 both volutes are shown (175° and 185°). The precise shape of the volute is not the most important thing, what is important is that the volute is "inflated" in upstream of the tongue relative to a standard volute. For ease of definition of the increase in A/R, it will be assumed herein that the standard volute A/R, the base line from which the present deviation is calculated, is a straight line. Deviation of the present invention is measured from such a straight line.

It will be appreciated that the configurations and routines disclosed herein are exemplary in nature, and that these specific embodiments are not to be considered in a limiting sense, because numerous variations are possible. For example, the above technology can be applied to I-4, I-6, V-6, V-12, opposed 4, and other engine types. Moreover, the above-described turbine housing could be used with a two cylinder engine, such as a V-twin or inline two-cylinder engine, wherein exhaust gas pulses from each of the two cylinders is directed to one of the two volutes.

In at least one embodiment, the above-described turbine configuration may be used with a turbine housing with a volute that is both sector divided and meridonally divided. Stated differently, the turbine housing may be divided into two volutes with circumferentially-spaced tongues and each of the two volutes may be divided transversely by an integral wall. Such a turbine housing would have four divided volutes. Such a turbine housing is described by U.S. Pat. No. 3,218,029 and U.S. Publication No. 2017/0183975 A1. Such a turbine housing may be advantageously applied with a four-cylinder engine such that the exhaust pulses for each cylinder travels through a separate volute. While a four-cylinder engine may be illustrated and discussed for simplicity, the turbine housing could also be used with a six cylinder engine, eight cylinder engine, a twelve cylinder engine, or a sixteen cylinder engine (or any other engine with a total number of cylinders that is an integer multiple of four).

The above-described turbine could also be used with an internal combustion engine having an uneven number of cylinders, such as a three-cylinder engine or a five-cylinder engine. In such configurations, a greater number of cylinders would exhaust to a first volute than to a second volute. For example, in a three-cylinder engine, cylinders 1 and 2 may exhaust to the first volute (5) and cylinder 3 may exhaust to the second volute (6). Likewise, in a five-cylinder engine, cylinders 1, 3, and 4 may exhaust to the first volute (5) and cylinders 2 and 5 may exhaust to the second volute (6). To accommodate the different volumetric flow rates caused by the different numbers of cylinders exhausting to the two volutes, the two volutes (5, 6) may have different cross-sectional flow areas. In the above-described examples of three and five-cylinder engines, the second volute (6) may have a smaller cross-sectional area than the first volute (5) since less exhaust gas passes through the second volute (6).

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings.

What is claimed is:

1. A turbine housing comprising a cavity for a turbine wheel, the cavity defining a turbine wheel axis of rotation, and
   first and second inlet volutes each comprising a volute passage spiraling radially inwards about the turbine wheel axis of rotation from a respective throat end to a respective tongue end and each volute having a flow axis;
   wherein the volute passage of the first inlet volute has a first angular length that extends from the first volute passage throat end to the first volute passage tongue end and the volute passage of the second inlet volute has a second angular length that extends from the second volute passage throat end to the second volute passage tongue end;
   wherein A is a flow-path cross-sectional area of a respective volute passage in $mm^2$ taken normal to the flow axis, R is a distance from a centroid of a volute cross-section of the respective volute passage to the turbine wheel axis of rotation in mm, and A/R is a quotient of the flow path cross-sectional area to the distance R,
   wherein the shape of the first and second volute passages is described by a graph having a horizontal axis and a vertical axis with the horizontal axis representing angular position values from 0° to 360° about the turbine wheel axis of rotation measured from the first volute passage throat end and with the vertical axis representing A/R %, which is A/R as a percentage of A/R at the first volute passage throat end, the graph having:
   a first point having a maximum NR % value of 100% and an angular position value of 0° corresponding to the first volute passage throat end,
   a second point having a minimum A/R % value corresponding with the first volute passage tongue end,
   a third point having a maximum A/R % value of 100% and an angular position value corresponding to the second volute passage throat end, wherein the third point is determined by drawing a straight line from the first point through the second point until the straight line intersects the x axis at A/R % value of 0%, which defines the second volute passage throat end,
   a fourth point determined by the intersection of a vertical line at 90% of the angular position value of the second point and the straight line;
   wherein the first inlet volute has an A/R % value at the vertical line that is 2.5 to 20 percentage points greater than the A/R % value at the fourth point.

2. The turbine housing of claim 1, wherein the A/R % for the first volute passage at the vertical line is 4-18 percentage points greater than the A/R % value at the fourth point.

3. The turbine housing of claim 1, wherein the A/R % for the first volute passage at the vertical line is 5-15 percentage points greater than the A/R % value at the fourth point.

* * * * *